(12) United States Patent
Hiwatashi

(10) Patent No.: US 11,911,974 B2
(45) Date of Patent: Feb. 27, 2024

(54) METAL/RESIN COMPOSITE STRUCTURE AND METHOD FOR MANUFACTURING SAME

(71) Applicant: DIC Corporation, Tokyo (JP)

(72) Inventor: Kenta Hiwatashi, Ichihara (JP)

(73) Assignee: DIC Corporation, Tokyo (JP)

( * ) Notice: Subject to any disclaimer, the term of this patent is extended or adjusted under 35 U.S.C. 154(b) by 1251 days.

(21) Appl. No.: 16/480,813

(22) PCT Filed: Nov. 28, 2017

(86) PCT No.: PCT/JP2017/042554
§ 371 (c)(1),
(2) Date: Jul. 25, 2019

(87) PCT Pub. No.: WO2018/139034
PCT Pub. Date: Aug. 2, 2018

(65) Prior Publication Data
US 2019/0389146 A1    Dec. 26, 2019

(30) Foreign Application Priority Data

Jan. 27, 2017  (JP) ................................. 2017-013131
Oct. 6, 2017   (JP) ................................. 2017-195967

(51) Int. Cl.
| | | |
|---|---|---|
| B23K 26/32 | (2014.01) | |
| B29C 65/00 | (2006.01) | |
| B32B 15/20 | (2006.01) | |
| B32B 15/08 | (2006.01) | |
| B32B 15/098 | (2006.01) | |
| B29K 705/02 | (2006.01) | |
| B29K 705/10 | (2006.01) | |
| B29K 705/12 | (2006.01) | |
| C08L 81/02 | (2006.01) | |
| B29C 65/40 | (2006.01) | |
| B29K 63/00 | (2006.01) | |

(52) U.S. Cl.
CPC ............ *B29C 65/405* (2013.01); *B23K 26/32* (2013.01); *B29C 66/73115* (2013.01); *B29C 66/91931* (2013.01); *B32B 15/08* (2013.01); *B32B 15/098* (2013.01); *B32B 15/20* (2013.01); *B29K 2063/00* (2013.01); *B29K 2705/02* (2013.01); *B29K 2705/10* (2013.01); *B29K 2705/12* (2013.01); *B29K 2881/04* (2013.01); *C08L 81/02* (2013.01)

(58) Field of Classification Search
CPC .............. B29C 65/405; B29C 6/73115; B29C 66/91931; B29C 37/0082; B29C 2045/14868; B29C 45/14311; B29C 45/14; B23K 26/32; B32B 15/08; B32B 15/098; B32B 15/20; B32B 7/04; B32B 15/18; B32B 27/304; B32B 3/263; B32B 3/30; B32B 2270/00; C08L 81/02; C08G 75/0259

USPC ......................................................... 428/457
See application file for complete search history.

(56) References Cited

U.S. PATENT DOCUMENTS

| | | | | |
|---|---|---|---|---|
| 5,912,320 A | * | 6/1999 | Hotta | ............... H01L 23/293 |
| | | | | 428/425.9 |
| 2015/0080498 A1 | | 3/2015 | Uchigata et al. | |

FOREIGN PATENT DOCUMENTS

| | | | |
|---|---|---|---|
| JP | 05-283453 A | | 10/1993 |
| JP | H05-259363 A | * | 10/1993 |
| JP | 2007-050630 A | | 3/2007 |
| JP | 2007099996 A | * | 4/2007 |
| JP | 2007191675 A | * | 8/2007 |
| JP | 4020957 B2 | | 12/2007 |
| JP | 2008055679 A | * | 3/2008 |
| JP | 2010-001340 A | | 1/2010 |
| JP | 2010-167475 A | | 8/2010 |
| JP | 2011114223 A | * | 6/2011 |
| JP | 2013-75997 A | | 4/2013 |
| JP | 2013-107273 A | | 6/2013 |
| JP | 2014-128939 A | | 7/2014 |
| JP | 2014-240134 A1 | | 12/2014 |
| JP | 2015-100959 A | | 6/2015 |
| KR | 10-2014-0144648 A | | 12/2014 |
| WO | 2007/072603 A1 | | 6/2007 |

(Continued)

OTHER PUBLICATIONS

English translation of WO2007072603A1 (Year: 2007).*
Machine translation of JP 2008-055679 A (Year: 2008).*
Machine translation of JP 2014-240134 A (Year: 2014).*
Machine translation of JP 2007-191675 A (Year: 2007).*
Machine translation of JP H05-259363 A (Year: 1993).*
Machine translation of JP 2007-099996 A (Year: 2007).*
Machine translation of JP 2011-114223 A (Year: 2011).*

(Continued)

*Primary Examiner* — Callie E Shosho
*Assistant Examiner* — Steven A Rice
(74) *Attorney, Agent, or Firm* — Locke Lord LLP

(57) ABSTRACT

Provided are: a metal-resin composite structure, including a surface-roughened metal member and a resin member bonded to the metal member and composed of a polyarylene sulfide resin (PAS) composition; a PAS resin composition and a resin member, for use in the metal-resin composite structure; and a method. More specifically, provided are: a PAS resin composition including a PAS resin (A) and a phenol resin (B) in an amount of 0.05 to 20 parts by mass with respect to 100 parts by mass of the resin (A); a resin member obtained by melt-molding the PAS resin composition; and a metal-resin composite structure including a surface-roughened metal member and a resin member bonded to the metal member and composed of the PAS resin composition, wherein the metal member is made of aluminum, copper, magnesium, iron, titanium or an alloy containing at least one of them; and a method for producing the same.

4 Claims, 1 Drawing Sheet

(56) References Cited

FOREIGN PATENT DOCUMENTS

| | | |
|---|---|---|
| WO | 13/141363 A1 | 9/2013 |
| WO | 2015/045724 A1 | 4/2015 |
| WO | 2017/161537 A1 | 9/2017 |

OTHER PUBLICATIONS

International Search Report dated Feb. 13, 2018, issued for PCT/JP2017/042554.
Supplementary European Search Report dated Jun. 22, 2020, issued for European Patent Application No. 17894442.7.

* cited by examiner

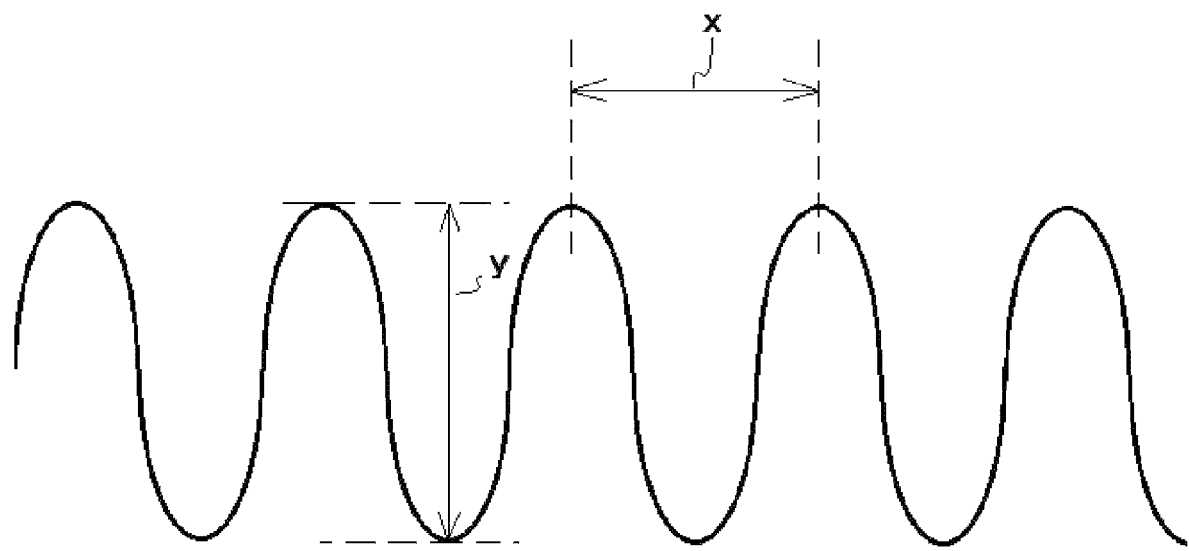

METAL/RESIN COMPOSITE STRUCTURE AND METHOD FOR MANUFACTURING SAME

TECHNICAL FIELD

The present invention relates to a metal-resin composite structure obtained by bonding a metal member and a resin member composed of a polyarylene sulfide resin composition, a method for producing the same, and a resin composition and a resin member for use in a metal-resin composite structure.

BACKGROUND ART

From the viewpoint of reducing the weight of various components, high heat resistance resin members are used as an alternative to metal members. However, in a case where it is difficult to substitute all the metal members with the problem of mechanical strength and the like, a composite structure (hereinafter referred to as a metal-resin composite structure) obtained by integrally bonding the metal member and the resin member is used. As such a metal-resin composite structure, for example, there is a method of obtaining the metal-resin composite structure by performing laser irradiation on the surface of a metal member to form a micro recess, and bonding the metal member to a resin member made of polyarylene sulfide resin by an anchor effect (see PTL 1 and PTL 2). Since the surface of the metal member formed by the laser irradiation is very coarse, the frictional force at the bonding surface to the resin is improved, and the durability is maintained against the shearing force acting in the same direction as the bonding surface. However, when the cold heat cycle test is conducted, the interfacial peeling is liable to occur at the submicron level with expansion/contraction of resin, and therefore there is a problem that the adhesion between the metal molded body and the resin molded body, in particular, the adhesion (cold heat cycle resistance) when the cold heat cycle is imposed, is low.

Therefore, when a recess is formed by laser irradiation on the surface of the metal member bonded to a resin member made of polyarylene sulfide resin, it has become possible to provide a metal-resin bonded molded article having high adhesion, particularly excellent cold heat cycle resistance, by making an angle formed between the surface of the metal member and the side surface of the recess within a range of 10 to 55° C. (see PTL 3). However, in the metal-resin bonded molded article, the resin flows into the recess of the metal member, and a region that becomes stuck after being solidified is formed, whereby excellent adhesion is obtained, and therefore there is a need for a resin material having higher fluidity that makes it easier for the resin member to flow into the recess of the metal member.

For improvement of the resin member, for example, there is known a composite obtained by injection molding a resin composition containing polyphenylene sulfide and a specific proportion of at least one polyolefin-based resin selected from the group consisting of a maleic anhydride-modified ethylene-based copolymer, a glycidyl methacrylate modified ethylene-based copolymer, a glycidyl ether modified ethylene-based copolymer and an ethylene alkyl acrylate copolymer into an aluminum alloy or magnesium alloy having a recess with a number average inner diameter of 10 to 80 nm on the surface by chemical solution treatment such as an erosive aqueous solution or erosive suspension, or an aluminum alloy having a recess with a number average inner diameter of 10 to 80 nm on the surface by treatment with an anodic oxidation method, and fixing the resin composition in a state where the resin composition is infiltrated into the recess (see PTL 5). Since the micro recess on the metal surface formed by any of the treatment methods has a very fine inner diameter, the resin composition hardly penetrates into the metal member, so that the adhesion between the metal component and the resin member composed of the resin composition is not sufficient.

For this reason, there has been a demand for the development of a resin material having more excellent fluidity in order to facilitate the penetration of a resin material into micro recess and protrusion portions formed by surface roughening, regardless of the method such as laser processing, treatment with an erosive aqueous solution or erosive suspension, anodic oxidation, or the like.

CITATION LIST

Patent Literature

PTL 1: International Publication WO 2007/072603 pamphlet
PTL 2: JP-A-2010-167475
PTL 3: JP-A-2013-107273
PTL 4: JP-A-2015-100959
PTL 5: JP-A-2007-050630

SUMMARY OF INVENTION

Technical Problem

Accordingly, it is an object of the present invention to provide a metal-resin composite structure excellent in adhesion, obtained by bonding a surface-roughened metal member and a resin member composed of a highly heat-resistant polyarylene sulfide resin composition, and a method for producing the same. Further, it is an object of the present invention to provide a polyarylene sulfide resin composition having excellent fluidity, in which a resin member, which is a molded body thereof, can exhibit excellent adhesion to a metal component having micro recess and protrusion portions formed on a surface thereof, and a resin member which can exhibit excellent adhesion to a metal component having micro recess and protrusion portions formed on the surface thereof, obtained by melt-molding the resin composition.

Solution to Problem

As a result of various studies, the present inventors have found that a polyarylene sulfide resin composition obtained by blending a polyarylene sulfide resin with a phenol resin is excellent in fluidity and can provide a resin member exhibiting excellent adhesion to a metal component having micro recess and protrusion portions formed on a surface thereof, thereby solving the present invention.

In other words, the present invention relates to a metal-resin composite structure including a surface-roughened metal member and a resin member bonded to the metal member and composed of a polyarylene sulfide resin composition wherein, the metal member is made of aluminum, copper, magnesium, iron, titanium or an alloy containing at least one of them, and the polyarylene sulfide resin composition is a molded product of a resin composition including a polyarylene sulfide resin (A) and a phenol resin (B) in an amount of 0.05 to 20 parts by mass with respect to 100 parts by mass of the polyarylene sulfide resin (A).

The present invention also relates to a method for producing a metal-resin composite structure including a surface-roughened metal member and a resin member bonded to the metal member and composed of a polyarylene sulfide resin composition, in which the metal member is made of aluminum, copper, magnesium, iron, titanium or an alloy containing at least one of them, the method including melt-molding the polyarylene sulfide resin composition including a polyarylene sulfide resin (A) and a phenol resin (B) to the metal member at a temperature equal to or higher than the melting point of the polyarylene sulfide resin (A).

The present invention also relates to a polyarylene sulfide resin composition for use in a metal-resin composite structure including a surface-roughened metal member and a resin member bonded to the metal member and composed of a polyarylene sulfide resin composition, wherein the metal member is made of aluminum, copper, magnesium, iron, titanium or an alloy containing at least one of them, the polyarylene sulfide resin composition including a blend of a polyarylene sulfide resin (A) and a phenol resin (B) as essential components, wherein the phenol resin (B) is blended in an amount of 0.05 to 20 parts by mass with respect to 100 parts by mass of the polyarylene sulfide resin (A).

The present invention also relates to a resin member for use in a metal-resin composite structure including a surface-roughened metal member and a resin member bonded to the metal member and composed of a polyarylene sulfide resin composition, wherein the metal member is made of aluminum, copper, magnesium, iron, titanium or an alloy containing at least one of them, and the polyarylene sulfide resin composition includes a blend of a polyarylene sulfide resin (A) and a phenol resin (B) as essential components, wherein the phenol resin (B) is blended in an amount of 0.05 to 20 parts by mass with respect to 100 parts by mass of the polyarylene sulfide resin (A), the resin member including a product obtained by melt-molding the polyarylene sulfide resin composition.

Advantageous Effects of Invention

According to the present invention, there is provided a metal-resin composite structure having excellent adhesion, which is obtained by bonding a surface-roughened metal member and a resin member composed of a polyarylene sulfide resin composition, and a method for producing the metal-resin composite structure. Further, the present invention can provide a polyarylene sulfide resin composition having excellent fluidity, in which a resin member, which is a molded body thereof, can exhibit excellent adhesion to a metal component having micro recess and protrusion portions formed on its surface, and a resin member which can exhibit excellent adhesion to a metal component having micro recess and protrusion portions formed on its surface, which is obtained by melt-molding the polyarylene sulfide resin composition.

BRIEF DESCRIPTION OF DRAWINGS

FIG. 1 is a cross-sectional view in a direction perpendicular to the surface of a metal member, and an explanatory view for showing a measurement reference on a micro uneven surface.

DESCRIPTION OF EMBODIMENTS

The metal-resin composite structure of the present invention is a metal-resin composite structure obtained by bonding a surface-roughened metal member and a resin member composed of a polyarylene sulfide resin composition, wherein the metal member is made of aluminum, copper, magnesium, iron, titanium or an alloy containing at least one of them, and wherein the polyarylene sulfide resin composition is obtained by molding a resin composition containing a polyarylene sulfide resin (A) and a phenol resin (B) in an amount of 0.05 to 20 parts by mass of the phenol resin (B) with respect to 100 parts by mass of the polyarylene sulfide resin (A).

(Metal Member)

The metal member for constituting the metal-resin composite structure of the present invention has a micro uneven surface (hereinafter simply referred to as a micro uneven surface) as a metal member surface to be bonded to a resin member composed of a polyarylene sulfide resin composition (hereinafter simply referred to as a metal member surface).

In the metal-resin composite structure of the present invention, the polyarylene sulfide resin composition used in the present invention, which has entered, in a molten state, the recess of the micro uneven surface, is solidified so that the metal member and the resin member composed of the resin composition are bonded to each other to form an interface between the metal member and the resin member (hereinafter simply referred to as a metal-resin interface).

In the metal member used in the present invention, a micro uneven surface is formed on the surface of the metal member by surface roughening. With respect to the distance between the recess and protrusion portions, the distance between protrusions adjacent to each other (hereinafter referred to as between protrusions) is preferably in the range of 5 nm or more, and more preferably in the range of 10 nm or more. Since the resin member can flow into the surface of the metal member even when the fluidity is low, the upper limit value is not particularly limited. It is preferably 700 μm or less, and more preferably 500 μm or less, because the adhesion tends to be improved when the density of recesses and protrusions is high. When the distance between protrusions is within the above range, the polyarylene sulfide resin composition used in the present invention can be brought into close contact with the recesses of the micro uneven surface, so that an excellent adhesion can be exhibited at the metal-resin interface. Further, it is preferable that the distance between recess and protrusion is periodic, so that a more excellent adhesion can be provided at the metal-resin interface.

Further, the height difference between recess and protrusion is preferably in the range of 50 nm or more, and more preferably in the range of 100 nm or more. The higher the height difference, the better the adhesion strength, but the height difference is preferably 500 μm or less in consideration of the filling of the resin so as not to generate voids in the recess and protrusion portions.

The distance between protrusions can be determined by selecting at least 50 sets of the two-point distance between protrusion tops adjacent to each other from a photograph taken, with an electron microscope or a laser microscope, of a cross section cut in the direction perpendicular to the micro uneven surface on the surface of the metal member, measuring the length (symbol x in FIG. 1) of the component in the direction parallel to the micro uneven surface on the surface of the metal member, and calculating the number average of the measurements. The height difference between recess and protrusion can be determined by selecting at least 50 sets of the two-point distance between a protrusion top and an adjacent recess bottom from a photograph taken, with an electron microscope or a laser microscope, of the cross section, measuring the length (symbol y in FIG. 1) of the component in the direction perpendicular to the micro uneven surface on the surface of the metal member after, and calculating the number average of the measurements.

Moreover, the uneven shape of the micro uneven surface is not particularly limited, and may be formed as a recess having a smaller pore diameter than a distance between the protrusions by surface roughening, which will be described later, and may be a shape observed in a forested state as a projection having a three dimensional aspect such as a protrusion having roundness, i.e., a spherical shape, a columnar shape or verruciform having a smooth end portion, or a fried dough cake shape, in which surface roughening is progressed.

Examples of the metal constituting the metal member include aluminum, copper, magnesium, iron, titanium, and alloys containing at least one of them. More specific examples thereof include iron; alloys containing iron as a main component, i.e., preferably 20% by mass or more, more preferably 50% by mass or more, and still more preferably 80% by mass or more, and other elements including carbon, silicon, manganese, chromium, tungsten, molybdenum, phosphor, titanium, vanadium, nickel, zirconium, and boron, such as stainless steel and steel (hereinafter referred to as iron alloys); aluminum; alloys containing aluminum as a main component and other elements containing copper, manganese, silicon, magnesium, zinc or nickel (hereinafter referred to as aluminum alloys); magnesium; alloys containing magnesium as a main component and other elements containing zinc, aluminum, zirconium and the like (hereinafter referred to as magnesium alloys); copper; alloys containing copper as a main component and other elements containing zinc, tin, phosphorus, nickel, magnesium, silicon, or chromium (hereinafter referred to as copper alloys); titanium; and alloys containing titanium as a main component and other elements containing copper, manganese, silicon, magnesium, zinc, or nickel (hereinafter referred to as titanium alloys). Among these, iron, iron alloy, aluminum alloy, magnesium alloy, copper alloy, and titanium alloy are more preferable, and iron alloy, aluminum alloy, and magnesium alloy are still more preferable.

It is preferable that the metal member used in the present invention is surface-roughened and has a micro uneven surface. The method for surface roughening is not particularly limited, and the following three kinds of methods may be used.

(1) Immersion method using an erosive aqueous solution or an erosive suspension. It is preferable to have a shape in which a micro uneven surface is formed on a metal surface, and further, it is more preferable that the metal surface is formed in a shape having a large number of recesses and each recess has a number average inner diameter in the range of 3 μm or less, and, it is still more preferable that the recesses have a number average inner diameter of 10 nm to 3 μm.

(2) Anodic oxidation method. It is preferable to form a large number of openings having a number average inner diameter of 1 μm or less in the surface layer by forming mainly a metal oxide layer on the surface, and in the same manner, it is more preferable to form an opening having a number average inner diameter of 1 nm to 1 μm, and further, it is still more preferable to form an opening having a number average inner diameter of 10 to 200 nm.

(3) A method for forming unevenness on a metal surface by pressing a die punch having unevenness formed by mechanical cutting, for example, diamond abrasive grinding or blast machining, or a method for forming an uneven shape on a metal surface by sandblasting or laser processing. It is preferable to process the surface mainly into a large number of recesses, and the number average inner diameter of the recess, or, the width when forming a recess having a continuous shape by laser processing and the like, is preferably in the range of 1 to 1000 μm, and more preferably in the range of 10 to 800 μm.

Before forming the micro uneven surface described above, it is preferable that the metal member be processed into a predetermined shape by means of a thinning process such as plastic working by cutting, pressing or the like, punching, machining, grinding, electric discharge machining or the like.

A primer layer may be formed on the surface of the metal member subjected to the surface treatment of the metal. The material constituting the primer layer is not particularly limited, but is usually made of a primer resin material containing a resin component. The primer resin material is not particularly limited and a known material may be used. Specific examples thereof include known polyolefin-based primers, epoxy-based primers, and urethane-based primers. The method for forming the primer layer is not particularly limited, and for example, a solution of the primer resin material described above or an emulsion of the primer resin material described above may be applied to a metal member subjected to the surface treatment described above to form a primer layer. Examples of the solvent to be used for the solution include toluene, methyl ethyl ketone (MEK), and dimethyl phosphoramide (DMF). Examples of the medium for the emulsion include an aliphatic hydrocarbon medium and water.

The polyarylene sulfide resin composition used in the present invention is obtained by blending a polyarylene sulfide resin (A) as an essential component.

The polyarylene sulfide resin (A) used in the present invention has a resin structure in which an aromatic ring and a sulfur atom are bonded to each other as a repeating unit, and specifically, the polyarylene sulfide resin (A) is a resin having a structural moiety represented by the following general formula (1):

[Chem. 1]

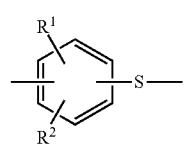

Formula (1)

(in the formula, $R^1$ and $R^2$ each independently represent a hydrogen atom, an alkyl group having 1 to 4 carbon atoms, a nitro group, an amino group, a phenyl group, a methoxy group or an ethoxy group) and optionally a trifunctional structural moiety represented by the following general formula (2):

[Chem. 2]

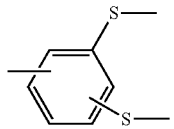

Formula (2)

as repeating units. The trifunctional structural moiety represented by the formula (2) is preferably in the range of 0.001 to 3 mol % and particularly preferably in the range of 0.01 to 1 mol % with respect to the total number of moles of the trifunctional structural moiety and other structural moieties.

Here, the structural moiety represented by the general formula (1) is preferably a hydrogen atom from the viewpoint of mechanical strength of the polyarylene sulfide resin in particular $R^1$ and $R^2$ in the formula, and in that case, there may be mentioned a group bonded at the para position represented by the following formula (3), and a group bonded at the meta position represented by the following formula (4).

[Chem. 3]

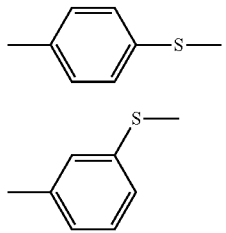

Formula (3)

Formula (4)

Among these, it is particularly preferable that the bonding of the sulfur atom to the aromatic ring in the repeating unit is a structure bonded at the para position represented by the general formula (3), from the viewpoints of heat resistance and crystallinity of the polyarylene sulfide resin.

In addition to the structural moiety represented by the general formula (1) or (2), the polyarylene sulfide resin may contain the structural moieties represented by the following structural formulae (5) to (8):

[Chem. 4]

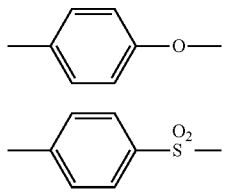

Formula (5)

Formula (6)

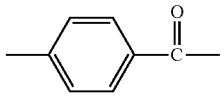

Formula (7)

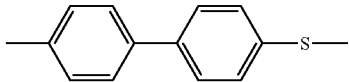

Formula (8)

in an amount of 30 mol % or less of the total of the structural moiety represented by the general formula (1) and the structural moiety represented by the general formula (2). In particular, in the present invention, the amount of the structural moieties represented by the general formulae (5) to (8) is preferably 10 mol % or less from the viewpoints of heat resistance and mechanical strength of the polyarylene sulfide resin. In the case where the polyarylene sulfide resin contains the structural moieties represented by the general formulae (5) to (8), the resulting copolymer may take a form of a random copolymer or a block copolymer.

The polyarylene sulfide resin may have a naphthyl sulfide bond or the like in its molecular structure, but the amount thereof is preferably 3 mol % or less, and more preferably 1 mol % or less, with respect to the total number of moles of the other structural moieties.

The physical properties of the polyarylene sulfide resin are not particularly limited as long as the effects of the present invention are not impaired, and are as follows.
(Melt Viscosity)

The polyarylene sulfide resin (A) used in the present invention preferably has a melt viscosity (V6) measured at 300° C. in the range of 2 to 1000 [Pa·s], and more preferably in the range of 10 to 500 [Pa·s], and particularly preferably in the range of 60 to 200 [Pa·s], since the balance between fluidity and mechanical strength is good. In the present invention, the melt viscosity (V6) is a value obtained by holding the polyarylene sulfide resin at 300° C., the load of $1.96 \times 10^6$ Pa, and the L/D=10 (mm)/1 (mm) for 6 minutes, and then measuring the melt viscosity, using a flow tester, CFT-500D manufactured by Shimadzu Corporation.
(Non-Newtonian Index)

The non-Newtonian index of the polyarylene sulfide resin (A) used in the present invention is not particularly limited as long as the effects of the present invention are not impaired, but it is preferably in the range of 0.90 to 2.00. When a linear polyarylene sulfide resin is used, the non-Newtonian index is preferably in the range of 0.90 to 1.50, and more preferably in the range of 0.95 to 1.20. Such polyarylene sulfide resins are excellent in mechanical properties, fluidity and abrasion resistance. The non-Newtonian index (N value) is a value calculated by measuring the shear rate and shearing stress under conditions of 300° C., the ratio of orifice length (L) to orifice diameter (D), L/D=40, observed with a capilograph, and using the following formula:

$$SR = K \cdot SS^N \qquad \text{[Math.1]}$$

[where SR represents shear rate (sec$^{-1}$), SS represents shear stress (dyn/cm$^2$), and K represents a constant.] The closer the N value is to 1, the more linear the structure of PPS. The higher the N value, the more branched the structure.
(Production Method)

The method for producing the polyarylene sulfide resin (A) is not particularly limited. Examples of the method include 1) a method in which a dihalogeno aromatic compound is polymerized with, if needed, adding a polyhalogeno aromatic compound or other copolymer components in the presence of sulfur and sodium carbonate, 2) a method in which a dihalogeno aromatic compound is polymerized with, if needed, adding a polyhalogeno aromatic compound or other copolymer components in the presence of a sulfidizing agent or the like in a polar solvent, and 3) a method in which a p-chlorothiophenol is subjected to self-condensation with, if needed, adding other copolymer components. Among these methods, the method 2) is versatile and preferable. During the reaction, an alkali metal salt of carboxylic acid or sulfonic acid or an alkali hydroxide may be added to control the degree of polymerization. In particular, a product obtained by any of the following methods of the method 2) above is preferable: a method for producing a polyarylene sulfide resin in which a hydrogenated sulfidizing agent is introduced into a mixture of a heated organic polar solvent and a dihalogeno aromatic compound at a rate at which water can be eliminated from the reaction mixture so as to allow the dihalogeno aromatic compound to react with the sulfidizing agent with, if needed, adding a polyhalogeno aromatic compound, in the organic polar solvent and the water content in the reaction system is controlled to be in the range of 0.02 to 0.5 mol per mole of the organic polar solvent (refer to Japanese Unexamined Patent Application Publication No. 07-228699); and a method in which a dihalogeno aromatic compound and, if needed, a polyhalogeno aromatic compound or other copolymer components are reacted in the presence of solid alkali metal sulfide and an aprotic polar organic solvent while controlling the amount of the alkali metal sulfide and the organic acid alkali metal salt to be in the rage of 0.01 to 0.9 mol per mole of the sulfur source and controlling the water content in the reaction system to be in the range of 0.02 mol or less per mole of the aprotic polar organic solvent (refer to WO2010/058713 pamphlet). Specific examples of the dihalogeno aromatic compound include p-dihalobenzene, m-dihalobenzene, o-dihalobenzene, 2,5-dihalotoluene, 1,4-dihalonaphthalene, 1-methoxy-2,5-dihalobenzene, 4,4'-dihalobiphenyl, 3,5-dihalobenzoic acid, 2,4-dihalobenzoic acid, 2,5-dihalonitrobenzene, 2,4-dihalonitrobenzene, 2,4-dihaloanisole, p,p'-dihalodiphenyl ether, 4,4'-dihalobenzophenone, 4,4'-dihalodiphenyl sulfone, 4,4'-dihalodiphenyl sulfoxide, 4,4'-dihalodiphenyl sulfide, and a compound having an alkyl group having 1 to 18 carbon atoms in the aromatic ring of each of the above compounds, and examples of the polyhalogeno aromatic compound include 1,2,3-trihalobenzene, 1,2,4-trihalobenzene, 1,3,5-trihalobenzene, 1,2,3,5-tetrahalobenzene, 1,2,4,5-tetrahalobenzene, and 1,4,6-trihalonaphthalene. It is preferable that the halogen atom contained in each of the above compounds is a chlorine atom or a bromine atom.

The post-treatment method of the reaction mixture containing the polyarylene sulfide resin obtained by the polymerization step is not particularly limited. Examples of the method include: (1) a method in which after completion of the polymerization reaction, the reaction mixture is added as it is or after adding an acid or a base, and then the solvent is distilled off under reduced pressure or normal pressure, and then the solid product after evaporation of the solvent is washed with a solvent such as water, a reaction solvent (or an organic solvent having an equivalent solubility to a low molecular weight polymer), acetone, methyl ethyl ketone, or alcohols once or twice or more times, and further is neutralized, washed with water, filtered and dried; or (2) a method in which after completion of the polymerization reaction, a solvent such as water, acetone, methyl ethyl ketone, alcohols, ethers, a halogenated hydrocarbon, an aromatic hydrocarbon, or an aliphatic hydrocarbon (a solvent which is soluble in the polymerization solvent used and which is a poor solvent for at least polyarylene sulfide) is added to the reaction mixture as a precipitating agent to precipitate solid products such as polyarylene sulfide and inorganic salts, which are separated by filtration, washed and dried; or (3) a method in which after completion of the polymerization reaction, a reaction solvent (or an organic solvent having equivalent solubility to a low molecular weight polymer) is added to the reaction mixture and stirred, followed by filtration to remove a low molecular weight polymer, and the product is washed with a solvent such as water, acetone, methyl ethyl ketone, or alcohols once or twice or more times, followed by neutralization, water washing, filtration and drying; or (4) a method in which after completion of the polymerization reaction, water is added to the reaction mixture and the mixture is washed with water, filtered, and if needed, subjected to acid treatment by adding an acid at the time of water washing, and dried; or (5) a method in which after completion of the polymerization reaction, the reaction mixture is filtered and, if needed, washed with a reaction solvent once or twice or more times, and further washed with water, filtered and dried.

In the post-treatment methods as exemplified in the above (1) to (5), drying of the polyarylene sulfide resin may be performed in a vacuum atmosphere or in an inert gas atmosphere such as air or nitrogen.

The polyarylene sulfide resin composition used in the present invention is obtained by blending a phenol resin (B) as an essential component.

The phenol resin used in the present invention is a thermoplastic polymer having a phenol skeleton, and either a novolac phenol resin or a bisphenol phenol resin can be used preferably, and a novolac phenol resin is more preferable.

The phenol resin is generally obtained by reacting a phenol compound and an aldehyde compound in the presence of an acid catalyst at 40 to 150° C. for 1 to 5 hours, then subjecting the reaction mixture to an atmospheric dehydration step or a reduced-pressure dehydration step, removing the remaining moisture from the reaction system, and dissolving the condensate in the reaction system in a solvent such as methanol. The ratio of [aldehyde compound]/[phenol compound] is not particularly limited in a known range, but is preferably in the range of 0.3 to 1.0 by molar ratio. The phenol skeleton is derived from a phenol compound of a starting material. The phenol compound is not particularly limited in a known range, and examples thereof include alkylphenols such as phenol, naphthol or cresol, xylenol, ethylphenol, butylphenol, and octylphenol; polyhydric phenols such as resorcin and catechol; bisphenols such as bisphenol A, bisphenol F, bisphenol S, bisphenol E, thiobisphenol, bis(hydroxyphenyl) ether, dihydroxy benzophenone, and bisphenol fluorenone; halogenated phenol; phenyl phenol; and aminophenol. Moreover, these phenol compounds are not limited to only one type in use, and two or more types may be used in combination.

The aldehyde compound is not particularly limited as long as it is generally used in the production of phenol resin, and examples thereof include formaldehydes such as formaldehyde, paraformaldehyde and trioxane, and acetaldehyde, and hexamethylenetetramine may also be used.

Examples of the acid catalyst include acids used in the production of novolac phenol resins, and examples thereof include formic acid, hydrochloric acid, phosphoric acid, sulfuric acid, para-toluenesulfonic acid, and phenolsulfonic acid.

Since the blending of the phenol resin can lower the viscosity of the polyarylene sulfide resin composition and can improve the fluidity at the time of molding, the composition flows into the details of the unevenness on the bonding surface of the metal member, thereby increasing the anchor effect. Furthermore, the presence of a hydroxyl group makes it possible to form a large number of hydrogen bonds on the bonding surface of the metal member, thereby improving adhesion. Further, even under a high-temperature and high-humidity environment, infiltration of moisture into the bonding surface can be suppressed, and a high bond retention ratio can be exhibited.

The hydroxyl group equivalent of the phenol resin is preferably high, and may be within a known range, but it is preferably in the range of 80 to 200 g/equivalent, more preferably in the range of 100 to 180 g/equivalent, and still more preferably in the range of 110 to 150 g/equivalent, because it can further improve bonding strength or adhesion.

The phenol resin may be either a solid type or a solvent type, but it is more preferable to use a solid type. When a solid type phenol resin is used, it is preferable to use the phenol resin having a softening point in the range of 50 to 180° C., and it is more preferable to use the phenol resin having a softening point in the range of 70 to 150° C. When a solvent type phenol resin is used, it is preferable to use the phenol resin having a viscosity (as a solid content 60% MEK solution) in the range of 50 to 2000 (25° C., mPa·s), and it is more preferable to use the phenol resin having a viscosity in the range of 70 to 1500 (25° C., mPa·s).

The blending proportion of the phenol resin (B) in the polyarylene sulfide resin composition is preferably in the range of 0.05 to 20 parts by mass with respect to 100 parts by mass of the polyarylene sulfide resin (A). It is more preferably in the range of 0.1 to 15 parts by mass, and still more preferably in the range of 0.5 to 10 parts by mass. Within the above range, it is possible to achieve both excellent metal member adhesiveness and low gas property at the time of melt-kneading or melt-molding.

If necessary, the polyarylene sulfide resin composition of the present invention may be blended with a filler as an optional component. As these fillers, known and commonly used materials can be used as long as the effects of the present invention are not impaired. Examples of such fillers include fillers of various shapes including a fibrous form or a non-fibrous form such as a granular shape or a tabular shape. Specifically, fibrous fillers such as glass fiber, carbon fiber, silane glass fiber, ceramic fiber, aramid fiber, metal fiber, potassium titanate fiber, silicon carbide fiber, calcium silicate fiber, wollastonite fiber, and natural fibers can be used, and non-fibrous fillers such as glass beads, glass flakes, barium sulfate, clay, pyrophyllite, bentonite, sericite, mica, mica, talc, attapulgite, ferrite, calcium silicate, calcium carbonate, calcium carbonate, magnesium carbonate, glass beads, zeolite, milled fiber, and calcium sulfate can also be used.

In the present invention, the filler is not an essential component, and when added to the polyarylene sulfide resin composition, the content thereof is not particularly limited as long as the effects of the present invention are not impaired. The content of the filler is, for example, preferably in the range of 1 to 600 parts by mass, more preferably in the range of 10 to 200 parts by mass with respect to 100 parts by mass of the polyarylene sulfide resin (A). Such a range is preferable because the resin composition exhibits good mechanical strength and moldability.

The polyarylene sulfide resin composition of the present invention may optionally be blended with a silane coupling agent as an optional component. The silane coupling agent is not particularly limited as long as the effects of the present invention are not impaired, and preferred examples thereof include a silane coupling agent having a functional group reactive with a carboxyl group, for example, an epoxy group, an isocyanato group, an amino group, or a hydroxyl group. Examples of such a silane coupling agent include epoxy group-containing alkoxysilane compounds such as γ-glycidoxypropyltrimethoxysilane, γ-glycidoxypropyltriethoxysilane, and β-(3,4-epoxycyclohexyl)ethyltrimethoxysilane; isocyanato group-containing alkoxysilane compounds such as γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane, and γ-isocyanatopropyltrichlorosilane; amino group-containing alkoxysilane compounds such as γ-(2-aminoethyl)aminopropylmethyldimethoxysilane, γ-(2-aminoethyl)aminopropyltrimethoxysilane, and γ-aminopropyltrimethoxysilane; and hydroxyl group-containing alkoxysilane compounds such as γ-hydroxypropyltrimethoxysilane and γ-hydroxypropyltriethoxysilane. Although the silane coupling agent is not an essential component in the present invention, and when added to the polyarylene sulfide resin composition, the blending proportion thereof is not particularly limited as long as the effects of the present invention are not impaired. The content of the silane coupling agent is preferably in the range of 0.01 to 10 parts by mass, and more preferably in the range of 0.1 to 5 parts by mass with respect to 100 parts by mass of the polyarylene sulfide resin (A). Such a range is preferable because the resin composition has good corona resistance and moldability, particularly releasability, and the molded article exhibits excellent adhesion with the epoxy resin while further improving the mechanical strength.

The polyarylene sulfide resin composition of the present invention may be blended with a thermoplastic elastomer as an optional component, if necessary. Examples of the thermoplastic elastomer include polyolefin elastomers, fluorine elastomers, and silicone elastomers, and polyolefin elastomers are preferred. When these elastomers are added to the resin composition, the blending proportion thereof is not particularly limited as long as the effects of the present invention are not impaired, and the content of the elastomer is preferably in the range of 0.01 to 30 parts by mass, and more preferably in the range of 0.1 to 25 parts by mass with respect to 100 parts by mass of the polyarylene sulfide resin (A). Such a range is preferable because the impact resistance of the resulting polyarylene sulfide resin composition is improved.

The polyolefin elastomer may be obtained by, for example, homopolymerization of an α-olefin or copolymerization of different α-olefins, and when a functional group is imparted, by copolymerization of an α-olefin and a vinyl polymerizable compound having a functional group. Examples of the α-olefin include, for example, those having 2 to 8 carbon atoms, such as ethylene, propylene, and butene-1. Examples of the functional group include a carboxyl group, an acid anhydride group represented by the formula —(CO)O(CO)—, an ester thereof, an epoxy group, an amino group, a hydroxyl group, a mercapto group, an isocyanate group, and an oxazoline group.

Specific examples of vinyl polymerizable compounds having such functional groups include α,β-unsaturated carboxylic acids such as (meth)acrylic acid and (meth)acrylic ester and alkyl esters thereof, maleic acid, fumaric acid, itaconic acid and other α,β-unsaturated dicarboxylic acids having 4 to 10 carbon atoms and derivatives thereof (mono- or diesters and anhydrides thereof), and glycidyl (meth) acrylate. Among these, ethylene-propylene copolymers and ethylene-butene copolymers having at least one functional group selected from the group consisting of the above-mentioned epoxy group, carboxy group and acid anhydride group are preferable from the viewpoint of improving mechanical strength, particularly toughness and impact resistance.

In the case where the elastomer has an epoxy group as a functional group, since it reacts with the phenol resin at the time of melt-kneading, the upper limit value of the blending proportion is preferably in the range of 10 parts by mass or less, more preferably in the range of 5 parts by mass or less with respect to 100 parts by mass of the polyarylene sulfide resin (A), and particularly preferably 0 parts by mass, that is, substantially not using an elastomer having such an epoxy group.

Further, in addition to the above components, the polyarylene sulfide resin composition of the present invention may contain a synthetic resin other than the polyarylene sulfide resin (A) as an optional component, depending on the application. Examples of the synthetic resin include a polyester resin, a polyamide resin, a polyimide resin, a polyetherimide resin, a polycarbonate resin, a polyphenylene ether resin, a polysulfone resin, a polyether sulfone resin, a polyether ether ketone resin, a polyether ketone resin, a polyarylene resin, a polyethylene resin, a polypropylene resin, a polytetrafluoroethylene resin, a polydifluoroethylene resin, a polystyrene resin, an ABS resin, a urethane resin, and a liquid crystal polymer. The blending proportion of the resin is different depending on the purpose, and cannot be specified unconditionally, but it may be used in the range of 0.01 to 1000 parts by mass with respect to 100 parts by mass of the polyarylene sulfide resin (A) by appropriately adjusting in accordance with the purpose or application so as not to impair the effects of the present invention.

The polyarylene sulfide resin composition of the present invention may contain, as optional components, known and commonly used additives such as a colorant, an antistatic agent, an antioxidant, a heat stabilizer, an ultraviolet stabilizer, an ultraviolet absorber, a foaming agent, a flame retardant, a flame retardant auxiliary agent, a release agent, a rust inhibitor, and a coupling agent. These additives are not essential components, and the blending proportion thereof is, for example, preferably in the range of 0.01 to 1000 parts by mass with respect to 100 parts by mass of the polyarylene sulfide resin (A). It may be appropriately adjusted and used in accordance with the purpose and application so as not to impair the effects of the present invention.

In a method for producing a polyarylene sulfide resin composition of the present invention, the polyarylene sulfide resin (A) and the phenol resin (B) are blended together as essential components, and melt-kneaded at a temperature equal to or higher than the melting point of the polyarylene sulfide resin (A).

Preferably, the polyarylene sulfide resin composition of the present invention may be produced through a step in which the polyarylene sulfide resin (A) and the phenol resin (B) as essential components, and optionally an optional component such as a filler, are charged into a ribbon blender, Henschel mixer, V blender, or the like, in various forms such as powders, pellets, and scrapes such that the above-mentioned blending proportion is obtained, and dry-blended, and then introduced into a known melt kneader such as Banbury mixers, mixing rolls, and single or twin-screw extruders and kneaders to perform melt-kneading the resin composition in a temperature range in which the temperature of the resin is equal to or higher than the melting point of the polyarylene sulfide resin (A), preferably in a temperature range of the melting point+10° C. or higher, more preferably in a temperature range of the melting point+10° C. to the melting point+100° C., and still more preferably in a temperature range of the melting point+20° C. to the melting point+50° C. The addition and mixing of the components to the melt kneader may be carried out simultaneously or may be carried out separately.

The melt kneader is preferably a twin-screw kneading extruder from the viewpoint of dispersibility and productivity. For example, it is preferable to perform melt-kneading while appropriately adjusting the discharge amount of the resin component in the range of 5 to 500 (kg/hr) and the screw rotation speed in the range of 50 to 500 (rpm), and it is more preferable to perform melt-kneading under the condition that the ratio (discharge amount/screw rotation speed) is in the range of 0.02 to 5 (kg/hr/rpm). In addition, when adding the filler or the additive among the above-mentioned components, it is preferable to introduce into the extruder from the side feeder of the twin-screw kneading extruder from the viewpoint of dispersibility. The position of the side feeder is preferably such that the ratio of the distance from the resin charging part of the extruder to the side feeder with respect to the total screw length of the twin-screw kneading extruder is in the range of 0.1 to 0.9. Among them, the range of 0.3 to 0.7 is particularly preferable.

The polyarylene sulfide resin composition of the present invention obtained by melt-kneading is a molten mixture containing the polyarylene sulfide resin (A) and the phenol resin (B) as essential components, and optionally an optional component and a component derived therefrom, and after melt-kneading, the polyarylene sulfide resin composition is preferably processed into a pellet, a chip, a granule, a powder or the like by a known method, and subjected to preliminary drying at a temperature of 100 to 150° C., if necessary, for use in various molding.

The polyarylene sulfide resin composition of the present invention produced by the above production method forms a morphology in which the polyarylene sulfide resin (A) is used as a matrix and the phenol resin (B), which is an essential component, and components derived therefrom, and optional components which are added as necessary, are dispersed in the matrix. It is considered that the polyarylene sulfide resin composition used in the present invention is capable of improving fluidity at the time of melting by breaking the crystallinity of the polyarylene sulfide resin which is the matrix and lowering the crystallization temperature by adding a phenol resin, and as a result, it becomes possible to enter the recess of the micro uneven portion formed by the surface roughening treatment on the metal member with good wettability, and it is considered that further excellent adhesion can be exhibited at the metal-resin interface. Since the adhesive effect is the principle of holding the metal-resin interface with a physical holding force called an anchor effect, if the surface of the metal member is roughened, the metal itself can exhibit the effect without any problem regardless of the material.

The metal-resin composite structure obtained by bonding a metal member and a resin member composed of a polyarylene sulfide resin composition may be obtained by melt-molding a polyarylene sulfide resin composition containing a polyarylene sulfide resin (A) and a phenol resin (B) to the metal member at a temperature equal to or higher than the melting point of the polyarylene sulfide resin (A). The melt-molding method of the resin member used in the present invention to the surface of the metal material can be carried out by various molding methods such as injection molding, compression molding, extrusion molding of a composite, sheet, pipe or the like, pultrusion molding, blow molding, and transfer molding, and it is preferable to use a so-called metal insert molding method in which a metal member is previously set in the mold and injection molding is carried out because it is particularly excellent in releasability. Regardless of which molding method is used, molding can be carried out according to a common method generally used as various molding conditions. For example, through the step of melting the polyarylene sulfide resin composition in a molding machine in a temperature range in which the temperature of the resin is equal to or higher than the melting point of the polyarylene sulfide resin (A), preferably in a temperature range of the melting point+10° C. or higher, more preferably in a temperature range of the melting point+10° C. to the melting point+100° C., and still more preferably in a temperature range of the melting point+20° C. to the melding point+50° C., the resin is discharged from the resin discharge port, and in the case of metal insert molding, molding may be carried out by, for example, injecting the resin into a mold in which the metal member is placed. In this case, the mold temperature may be set to a known temperature range, for example, room temperature (23° C.) to 300° C., preferably 40 to 200° C., more preferably 120 to 180° C.

Examples of main applications of the composite molded body include: electric and electronic parts represented by casings of electronic devices such as various home appliances, mobile phones, and PCs (Personal Computers), protection/supporting members for box-type electric/electronic component integrated module, plural individual semiconductors or modules, sensors, LED lamps, connectors, sockets, resistors, relay cases, switches, coil bobbins, capacitors, variable condenser cases, optical pickups, oscillators, various terminal boards, transformers, plugs, printed boards, tuners, speakers, microphones, headphones, small motors, magnetic head bases, power modules, terminal blocks, semiconductors, liquid crystals, FDD carriages, FDD chassis, motor brush holders, parabola antennas, and computer related parts; home and office electric appliance parts represented by VTR parts, TV parts, irons, hair dryers, rice cooker parts, microwave oven parts, audio parts, audio and video equipment parts such as audio, laser disc, compact disc, DVD disc, and Blu-ray disc, lighting parts, refrigerator parts, air conditioner parts, typewriter parts, word processor parts, or water supply parts such as water heater, and bath water level and temperature sensor; machine related parts represented by office computer related parts, telephone related parts, facsimile related parts, copier related parts, cleaning jigs, motor parts, lighters, and typewriters; optical devices and precision instruments related parts represented by microscopes, binoculars, cameras, and watches; automobile-vehicle related parts represented by alternator terminals, alternator connectors, brush holders, slip rings, IC regulators, potentiometer bases for light dimmers, relay blocks, inhibitor switches, various valves such as exhaust gas valve, various pipes related to fuel, exhaust system or intake system, air intake nozzle snorkels, intake manifolds, fuel pumps, engine coolant joints, carburetor main bodies, carburetor spacers, exhaust gas sensors, coolant sensors, oil temperature sensors, brake pad wear sensors, throttle position sensors, crankshaft position sensors, air flow meters, brake pad wear sensors, thermostat bases for air conditioner, heating warm air flow control valves, blush holders for radiator motor, water pump impellers, turbine vanes, wiper motor related parts, distributors, starter switches, ignition coils and bobbins, motor insulators, motor rotors, motor cores, starter relays, wire harness for transmission, window washer nozzles, air conditioner panel switch boards, coils for fuel related electromagnetic valve, connectors for fuse, horn terminals, electrical component insulating plates, stepper motor rotors, lamp sockets, lamp reflectors, lamp housings, brake pistons, solenoid bobbins, engine oil filters, and ignition equipment cases; and various other applications.

EXAMPLES

The present invention will now be described in more detail with reference to specific examples. In addition, the parts and % are based on mass unless otherwise specified.

(Measurement Example 1) Measurement of Melt Viscosity of Polyphenylene Sulfide Resin The melt viscosity of the polyphenylene sulfide resin produced in Reference Example was measured after holding the resin at 300° C., a load of $1.96 \times 10^6$ Pa, and L/D=10 (mm)/1 (mm) for 6 minutes, using a flow tester, CFT-500D, manufactured by Shimadzu Corporation.

(Preparation Example 1) Preparation of Polyphenylene Sulfide Resin (A-1)

[Step 1]

To a 150-L autoclave equipped with a stirring blade and connected to a pressure gauge, a thermometer, a condenser, a decanter, and a rectifying column, 33.222 kg (226 moles) of p-dichlorobenzene (hereinafter abbreviated to "p-DCB"), 3.420 kg (34.5 moles) of NMP, 27.300 kg (230 moles on a NaSH basis) of a 47.23 mass % aqueous NaSH solution, and 18.533 g (228 moles on a NaOH basis) of a 49.21 mass % aqueous NaOH solution were charged. The temperature of the resulting reaction mixture was increased to 173° C. over a period of five hours in a nitrogen atmosphere while stirring, 27.300 kg of water was distilled, and the autoclave was then sealed. In this step, p-DCB distilled by azeotropy during dehydration was separated by the decanter, and returned to the autoclave as needed. A particulate anhydrous sodium sulfide composition was dispersed in p-DCB inside the autoclave after the completion of dehydration. The NMP content in this composition was 0.079 kg (0.8 moles). This result shows that 98% by mole (33.7 moles) of the charged NMP was hydrolyzed into a sodium salt of a ring-opening product of NMP (4-(methylamino) butyric acid) (hereinafter abbreviated to "SMAB"). The amount of SMAB in the autoclave was 0.147 moles per mole of sulfur atoms present in the autoclave. If all the charged NaSH and NaOH are changed to anhydrous $Na_2S$, the theoretical amount of dehydration is estimated to be 27.921 g. Accordingly, the above result showed that, out of 878 g (48.8 moles) of water remaining in the autoclave, 609 g (33.8 moles) of water was consumed in the hydrolysis reaction between NMP and NaOH and was not present in the autoclave as water, and the residual 269 g (14.9 moles) of water remained in the autoclave in the form of water or crystal water. The amount of water in the autoclave was 0.065 moles per mole of sulfur atoms present in the autoclave.

[Step 2]

After the completion of the dehydration step, the inner temperature was cooled to 160° C., 46.343 kg (467.5 moles) of NMP was charged, and the temperature was increased to 185° C. The amount of water in the autoclave was 0.025 moles per mole of NMP charged in step 2. At the time when the gauge pressure reached 0.00 MPa, a valve connected to the rectifying column was opened, and the inner temperature was increased to 200° C. over a period of one hour. At this time, the temperature at an outlet of the rectifying column was controlled to be 110° C. or lower by cooling and adjusting the degree of opening of the valve. A mixed vapor of the distilled p-DCB and water was condensed by the condenser and separated by the decanter, and p-DCB was returned to the autoclave. The amount of distilled water was 228 g (12.7 moles).

[Step 3]

The amount of water in the autoclave at the start of step 3 was 41 g (2.3 moles). Specifically, the amount of water was 0.005 moles per mole of NMP charged in step 2, and 0.010 moles per mole of sulfur atoms present in the autoclave. The amount of SMAB in the autoclave was 0.147 moles per mole of sulfur atoms present in the autoclave as in step 1. Subsequently, the inner temperature was increased from 200° C. to 230° C. over a period of three hours, and after stirring was conducted at 230° C. for one hour. The inner temperature was then increased to 250° C., and stirring was conducted for one hour. The gauge pressure at the time of an inner temperature of 200° C. was 0.03 MPa, and the final gauge pressure was 0.40 MPa. After cooling, a part, specifically 650 g, of the resulting slurry was poured into 3 L of water, and the mixture was stirred at 80° C. for one hour and was then filtered. This resulting cake was stirred again in 3 L of hot water for one hour, washed, and then filtered. This operation was repeated four times. This resulting cake was again adjusted to pH 4.0 with 3 L of hot water and acetic acid, stirred for one hour, washed and filtered. This resulting cake was stirred again in 3 L of hot water for one hour, washed, and then filtered. This operation was repeated two times. The resultant mixture was dried at 120° C. for one night using a hot air dryer. Thus, a PPS resin (A-1) was obtained in the form of a white powder. This polymer had a melt viscosity of 41 Pas at 300° C. The non-Newtonian index was 1.07.

(Preparation Example 2) Preparation of Polyphenylene Sulfide Resin (A-2)

A PPS resin (hereinafter referred to as A-2) was obtained in the form of a white powder in the same manner as in Preparation Example 1 except that the process in which subsequently, the inner temperature was increased from 200° C. to 230° C. over a period of three hours, and after stirring was conducted at 230° C. for one hour, the inner temperature was increased to 250° C. and stirring was conducted for one hour was changed to a process in which subsequently, the inner temperature was increased from 200° C. to 230° C. over a period of three hours, and after stirring was conducted at 230° C. for 1.5 hours, the inner temperature was increased to 250° C. and stirring was conducted for one hour. The resulting polymer had a melt viscosity of 73 Pa·s and the non-Newtonian index of 1.07.

(Preparation Example 3) Preparation of Polyphenylene Sulfide Resin (A-3)

To a 150-L autoclave equipped with a stirring blade and a bottom valve connected to a pressure gauge, a thermometer, and a condenser, 19.413 kg of flaky sodium sulfide (60.3 wt % $Na_2S$) and 45.0 kg of NMP were charged. The temperature of the resulting reaction mixture was increased to 209° C. in a nitrogen gas stream while stirring, 4.644 kg of water was distilled (the amount of residual water was 1.13 mole per mol of sodium sulfide). The autoclave was then sealed and cooled to 180° C., and 22.185 kg of paradichlorobenzene, 0.027 kg of 1,2,4-trichlorobenzene and 18.0 kg of NMP were charged. At a liquid temperature of 150° C., the autoclave was pressurized to a gauge pressure of 0.1 MPa using nitrogen gas when the temperature started to be raised. After holding at a liquid temperature of 240° C. for two hours, the reaction was allowed to proceed while stirring at a liquid temperature of 260° C. for three hours, and the upper portion of the autoclave was cooled by sprinkling water. Then, the temperature was lowered and the cooling of the upper portion of the autoclave was stopped. During cooling of the upper portion of the autoclave, the liquid temperature was kept constant so as not to be decreased. The maximum pressure during the reaction was 0.85 MPa. After the reaction, the reaction solution was cooled, and at a temperature of 170° C., a solution containing 0.284 kg (2.25 moles) of oxalic acid dihydrate in 0.663 kg of NMP was injected under pressure. After stirring for 30 minutes, the reaction mixture was cooled, the bottom valve was opened at 100° C., the reaction slurry was transferred to a 150-L flat plate filter and subjected to pressure filtration at 120° C., and then 16 kg of NMP was added thereto, followed by pressure filtration. After filtration, the reaction mixture was stirred at 150° C. under reduced pressure for two hours using a 150-L vacuum dryer equipped with a stirring blade to remove NMP, thereby obtaining a PPS resin (A-3) in the form of a white powder. This polymer had a melt viscosity of 77 Pa·s at 300° C. The non-Newtonian index was 1.25.

(Preparation Example 4) Preparation of Polyphenylene Sulfide Resin (A-4)

To a 150-L autoclave equipped with a stirring blade and a bottom valve connected to a pressure gauge, a thermometer, and a condenser, 19.413 kg of flaky sodium sulfide (60.3 wt % $Na_2S$) and 45.0 kg of NMP were charged. The temperature of the resulting reaction mixture was increased to 209° C. in a nitrogen gas stream while stirring, 4.644 kg of water was distilled (the amount of residual water was 1.13 mole per mol of sodium sulfide). The autoclave was then sealed and cooled to 180° C., and 23.211 kg of paradichlorobenzene and 18.0 kg of NMP were charged. At a liquid temperature of 150° C., the autoclave was pressurized to a gauge pressure of 0.1 MPa using nitrogen gas when the temperature started to be raised. The reaction was allowed to proceed while stirring at a liquid temperature of 260° C. for three hours, and the upper portion of the autoclave was cooled by sprinkling water. Then, the temperature was lowered and the cooling of the upper portion of the autoclave was stopped. During cooling of the upper portion of the autoclave, the liquid temperature was kept constant so as not to be decreased. The maximum pressure during the reaction was 0.85 MPa.

After the reaction, the reaction solution was cooled, and after cooling, 650 g of the obtained slurry was poured into 3 L of water, and the mixture was stirred at 80° C. for one hour, followed by filtration. This resulting cake was stirred again in 3 L of hot water for one hour, washed, and then filtered. This operation was repeated seven times. The resultant mixture was dried at 120° C. for one night using a hot air dryer.

Thereafter, heat treatment was carried out with a hot air dryer at 240° C. for three hours to obtain a PPS resin (A-4). The resulting polymer had a melt viscosity of 28 Pa·s and the non-Newtonian index of 1.21.

(Examples 1 to 8 and Comparative Examples 1 to 4) Preparation of Thermoplastic Resin Composition Each material was uniformly mixed with a tumbler according to the composition components and blending amounts (all parts by mass) described in Tables 1 to 4. After that, the blended material was put into a vented twin-screw extruder "TEX30α" manufactured by The Japan Steel Works, Ltd., and the resin composition was melt-kneaded by setting a resin component discharge amount of 25 kg/hr, a screw rotation speed of 250 rpm, and a setting resin temperature of 330° C. to obtain pellets of the resin composition. The pellets were used to carryout the following various evaluation tests. The results of the tests and evaluations are shown in Tables 1 to 3.

(Measurement Example 2) Adhesion Strength

Test Method

The metal test piece (length×width×thickness=50 mm×10 mm×2 mm) subjected to the following roughening treatment was set in a mold for injection molding (mold temperature was 140° C.), and a metal-resin composite structure (based on a Type-A type conforming to ISO 19095) was molded so that the treated surface (10 mm×2 mm) and the resin composition were vertically bonded to each other. A tensile test (tensile speed 1 mm/min) perpendicular to the bonding surface of the obtained structure was carried out, and the maximum stress value obtained was regarded as the adhesion strength.

Metal treatment (S): A metal piece was cut out from the aluminum plate (material: A1050) to the above-mentioned size, and further the bonding surface was polished (abrasive paper roughness: No. 1000). When the bonding surface after polishing was observed by an electron microscope, it was not observed that the surface was covered with a recess having a number average inner diameter of 100 nm or less. A hole was formed at the end opposite to the bonding surface of the aluminum piece, and a copper wire coated with vinyl chloride was passed through more than a dozen holes to bend the copper wire so that the aluminum pieces did not overlap each other, so that all of the aluminum pieces were suspended at the same time.

After a commercially available degreasing agent for aluminum alloy, "NE-6" (manufactured by Meltex Co., Ltd.) 7.5% was poured into water in a vessel, it was heated and dissolved at 75° C., and the aluminum piece was immersed for 5 minutes, and washed thoroughly with water. Subsequently, a 10% aqueous sodium hydroxide solution was prepared in a separate vessel at 50° C., and the aluminum piece was immersed in this vessel for 0.5 minutes, and washed thoroughly with water.

Then, a 60% nitric acid solution, which was set to 90° C., was prepared in a separate vessel, immersed for 15 seconds, and washed thoroughly with water. Subsequently, a 5% sulfuric acid aqueous solution, which was set to 20° C., was prepared in another vessel, the anode of the DC power supply device "ASR3SD-150-500 (manufactured by Chuo Seisakusho)" was connected to the hole portion of the aluminum piece, and the cathode was connected to a lead plate placed in the vessel to be subjected to anodic oxidation with constant current control having a current density of 5 A/dm². The mixture was anodized for 40 minutes, washed with water, and then placed in a hot air dryer at 60° C. for one hour to dry it. One day after, one of the bonding surfaces was photographed with a scanning electron microscope (magnification: 500,000×), and 50 recesses were randomly selected from each image and measured. Recesses were periodically formed continuously on the surface, and the distance between the protrusions was 50 nm in number average, the number average pore diameter was 30 μm, and the density of the recess was 10 recesses per 100 nm².

After the treatment, the resulting product was rapidly molded, and the adhesion strength (S1) was measured. Further, the adhesion strength (S2) was measured after standing for 200 hours in an environment of constant temperature and humidity (80° C., humidity 95%). Evaluation was carried out at n=3, and an average value thereof was taken.

Metal treatment (T): Laser groove processing was performed using a YAG laser marker device ("LAY-791DE" manufactured by Shibaura Eletec Corporation) as a metal test piece. Continuous grooves having a length of 10 mm, a depth of 150 μm and a width of 100 μm were formed at intervals of 100 μm on the end face of the metal piece.

After the treatment, the resulting product was rapidly molded, and the adhesion strength (T1) was measured. Further, the adhesion strength (T2) was measured after standing for 200 hours in an environment of constant temperature and humidity (80° C., humidity 95%). Evaluation was carried out at n=3, and an average value thereof was taken.

TABLE 1

|  |  | Example 1 | Example 2 | Example 3 | Example 4 |
|---|---|---|---|---|---|
| A-1 |  | 69.0 | 64.0 | 69.0 | 69.0 |
| A-2 |  |  |  |  |  |
| A-3 |  |  |  |  |  |
| A-4 |  |  |  |  |  |
| B-1 |  | 1.0 | 6.0 |  |  |
| B-2 |  |  |  | 1.0 |  |
| B-3 |  |  |  |  | 1.0 |
| B-4 |  |  |  |  |  |
| b-5 |  |  |  |  |  |
| C-1 |  | 30.0 | 30.0 | 30.0 | 30.0 |
| Adhesion strength |  |  |  |  |  |
| Metal treatment (anodic oxidation) | S1(MPa) | 43.1 | 44.1 | 41.3 | 40.5 |
|  | S2(MPa) | 40.4 | 42.5 | 39.8 | 40.3 |
| Metal treatment (laser) | T1(MPa) | 60.9 | 55.9 | 62.7 | 52.3 |
|  | T2(MPa) | 52.1 | 56.5 | 51.0 | 50.4 |

TABLE 2

|  | Example 5 | Example 6 | Comparative Example 1 | Comparative Example 2 |
|---|---|---|---|---|
| A-1 | 69.0 | 64.0 | 70.0 | 64.0 |
| A-2 |  |  |  |  |
| A-3 |  |  |  |  |
| A-4 |  |  |  |  |
| B-1 |  |  |  |  |
| B-2 |  |  |  |  |
| B-3 |  |  |  |  |
| B-4 | 1.0 | 6.0 |  |  |
| b-5 |  |  |  | 6.0 |
| C-1 | 30.0 | 30.0 | 30.0 | 30.0 |

TABLE 2-continued

|  |  | Example 5 | Example 6 | Comparative Example 1 | Comparative Example 2 |
|---|---|---|---|---|---|
| Adhesion strength | | | | | |
| Metal treatment (anodic oxidation) | S1(MPa) | 43.3 | 44.1 | 33.4 | 38.3 |
| | S2(MPa) | 41.0 | 42.5 | 35.8 | 17.5 |
| Metal treatment (laser) | T1(MPa) | 63.2 | 55.3 | 42.8 | 45.3 |
| | T2(MPa) | 54.3 | 53.8 | 48.4 | 21.2 |

TABLE 3

|  |  | Example 7 | Comparative Example 3 | Example 8 | Comparative Example 4 |
|---|---|---|---|---|---|
| A-1 | | 59.0 | 60.0 | | |
| A-2 | | | | 59.0 | 60.0 |
| A-3 | | | | | |
| A-4 | | | | | |
| B-1 | | 1.0 | | 1.0 | |
| B-2 | | | | | |
| B-3 | | | | | |
| B-4 | | | | | |
| b-5 | | | | | |
| C-1 | | 40.0 | 40.0 | 40.0 | 40.0 |
| Adhesion strength | | | | | |
| Metal treatment (anodic oxidation) | S1(MPa) | 36.5 | 30.2 | 34.9 | 29.5 |
| | S2(MPa) | 36.0 | 30.5 | 35.2 | 29.0 |
| Metal treatment (laser) | T1(MPa) | 66.6 | 59.4 | 65.8 | 50.9 |
| | T2(MPa) | 59.4 | 56.8 | 62.7 | 51.5 |

TABLE 4

|  |  | Example 9 | Comparative Example 5 | Example 10 | Comparative Example 6 |
|---|---|---|---|---|---|
| A-1 | | | | | |
| A-2 | | | | | |
| A-3 | | 59.0 | 60.0 | | |
| A-4 | | | | 59.0 | 40.0 |
| B-1 | | 1.0 | | 1.0 | |
| B-2 | | | | | |
| B-3 | | | | | |
| B-4 | | | | | |
| b-5 | | | | | |
| C-1 | | 40.0 | 40.0 | 40.0 | 40.0 |
| Adhesion strength | | | | | |
| Metal treatment (anodic oxidation) | S1(MPa) | 31.5 | 21.9 | 35.5 | 30.8 |
| | S2(MPa) | 30.4 | 20.9 | 34.9 | 30.4 |
| Metal treatment (laser) | T1(MPa) | 60.1 | 43.8 | 65.6 | 58.8 |
| | T2(MPa) | 60.3 | 43.7 | 60.1 | 56.6 |

The blending proportion of the blended resins and materials in Tables 1 to 4 represents parts by mass, and the followings were used.

B-1: phenol novolac resin "TD-2090", manufactured by DIC corporation (hydroxyl group equivalent: 105 g/equivalent, softening point: 117 to 123° C.)

B-2: phenol novolac resin "TD-2093", manufactured by DIC corporation (hydroxyl group equivalent: 104 g/equivalent, softening point: 98 to 102° C.)

B-3: phenol novolac resin "TD-2131", manufactured by DIC corporation (hydroxyl group equivalent: 104 g/equivalent, softening point: 78 to 82° C.)

B-4: cresol novolac resin "KA-1165", manufactured by DIC corporation (hydroxyl group equivalent: 119 g/equivalent, softening point: 117 to 130° C.)

b-5: ethylene (88% by mass)-glycidyl dimethacrylate (12% by mass) copolymer, "Bondfast 7L" manufactured by Sumitomo Chemical Co., Ltd.

*The softening point of the phenol resin is a valued measured at a temperature rise of 3° C./minute by using a ring and ball softening point measuring apparatus ASP-M4SP manufactured by Meiho Corporation. Moreover, the measurement of the hydroxyl group equivalent of a phenol resin is taken as the value measured by the method based on the neutralization titration method specified in JIS K 0070 (1992).

C-1: glass fiber (chopped strand, E glass, average fiber length 200 μm, average diameter 10 μm, surface treated with epoxy-based sizing agent)

REFERENCE SIGNS LIST x: The length of the component in the direction parallel to the micro uneven surface of the metal member surface with respect to the two-point distance between protrusion tops adjacent to each other y: The length of the component in the direction perpendicular to the micro uneven surface of the metal member surface with respect to the two-point distance between a protrusion top and an adjacent recess bottom

The invention claimed is:

1. A metal-resin composite structure comprising: a surface-roughened metal member; and a resin member bonded to the metal member and composed of a polyarylene sulfide resin composition, wherein
   the metal member is made of aluminum, copper, magnesium, iron, titanium or an alloy containing at least one of them,
   the polyarylene sulfide resin composition is a molded product of a resin composition including a polyarylene sulfide resin (A) and a phenol resin (B) in an amount of 0.05 to 20 parts by mass with respect to 100 parts by mass of the polyarylene sulfide resin (A),
   wherein the phenol resin (B) is a novolac phenol resin which is a thermoplastic polymer having a phenol skeleton,
   wherein the phenol resin (B) has a hydroxyl group equivalent in a range of 80 to 200 g/equivalent, and
   wherein the phenol resin (B) has a softening point in a range of 98 to 180° C.

2. The metal-resin composite structure according to claim 1, wherein the polyarylene sulfide resin composition is a melt-kneaded material.

3. The metal-resin composite structure according to claim 1, wherein the resin member is a product obtained by melt-molding the polyarylene sulfide resin composition.

4. A method for producing a metal-resin composite structure comprising a surface-roughened metal member and a resin member bonded to the metal member and composed of a polyarylene sulfide resin composition, in which the metal member is made of aluminum, copper, magnesium, iron, titanium or an alloy containing at least one of them,
   the method comprising melt-molding the polyarylene sulfide resin composition including a polyarylene sulfide resin (A) and a phenol resin (B) to the metal member at a temperature equal to or higher than the melting point of the polyarylene sulfide resin (A), wherein the polyarylene sulfide resin composition is a molded product of a resin composition including a polyarylene sulfide resin (A) and a phenol resin (B) in an amount of 0.05 to 20 parts by mass with respect to 100 parts by mass of the polyarylene sulfide resin (A), wherein the phenol resin (B) is a novolac phenol resin which is a thermoplastic polymer having a phenol skeleton, wherein the phenol resin (B) has a hydroxyl group equivalent in a range of 80 to 200 g/equivalent, and wherein the phenol resin (B) has a softening point in a range of 98 to 180° C.

\* \* \* \* \*